July 6, 1926.

J. W. BETTENDORF

BRAKE HANGER

Filed Nov. 6, 1925

1,591,503

INVENTOR
J. W. Bettendorf
BY Lloyd L. Evans
ATTORNEY

Patented July 6, 1926.

1,591,503

UNITED STATES PATENT OFFICE.

JOSEPH W. BETTENDORF, OF BETTENDORF, IOWA.

BRAKE HANGER.

Application filed November 6, 1925. Serial No. 67,259.

This invention relates to railway brake hanger mechanism, and more particularly to the construction of a brake hanger and brake hanger support and to means for decreasing the wear on said hanger and support.

In railway brake hanger construction it is desirable and important that the hanger be connected to its support, such as a bracket, in a secure manner, and that the hanger be supported so that both hanger and the bearing portion of the bracket may withstand long usage. Furthermore, the hanger and bracket connection must be secure to prevent the brake construction from dropping and thereby causing possible derailment and consequent wreckage. Economically it is desirable, particularly where the supporting bracket is integral with the frame, that said bracket last the life of the railway truck or car.

An object of this invention is to provide a brake hanger and supporting bracket connection adapted to provide long life of the brake hanger and bracket.

Another object of my invention is to provide a long bearing surface between a brake hanger and the bearing portion in which it is supported over which the pressure and wear may be substantially uniformly distributed.

A further object of the invention is to provide bushings between cooperating brake hangers and the bearing portions of supporting means, said bushings being adapted to prevent wear of said cooperating parts, whatever be the direction of thrust of said brake hanger.

A further object of this invention is to provide bushings between cooperating brake hangers and the bearing portions of supporting brackets, said bushings being locked against rotation with respect to either or both brake hanger and the bearing portion of the bracket.

Another object of the invention is to provide a means for easily assembling brake hangers and supporting brackets so that the brake hanger cannot become detached from the bracket during the normal operation of the brake mechanism.

These and other objects of my invention will be apparent from the following description and annexed drawings, in which:—

Fig. 6 is a view similar to Fig. 3 showing the bearing portion in section, and showing a bushing disposed about the end of a brake hanger and locked against rotational movement therewith.

Figure 1:
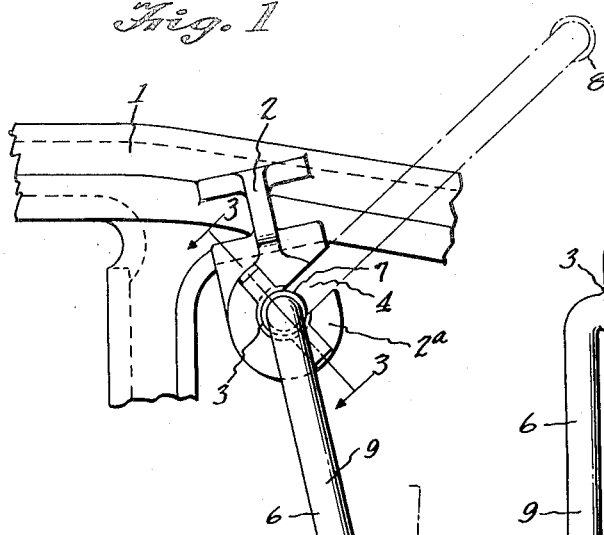
Figure 1 is a fragmentary side elevation showing a portion of a truck side frame, a brake hanger supporting bracket integrally formed therewith, and a brake hanger supported in the bearing portion of said bracket, a bushing according to my invention being disposed between said brake hanger and bearing portion.
Figure 2:
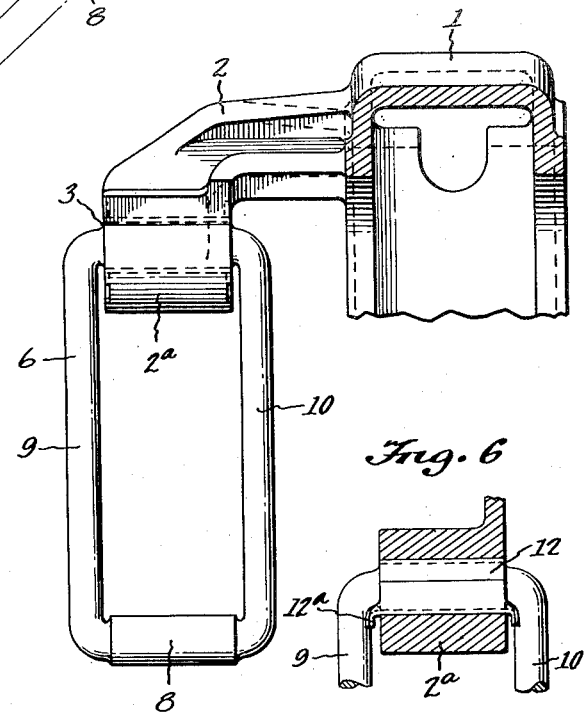
Fig. 2 is a fragmentary front elevation, partly in section, of the cooperating parts shown in Fig. 1.
Figure 3:
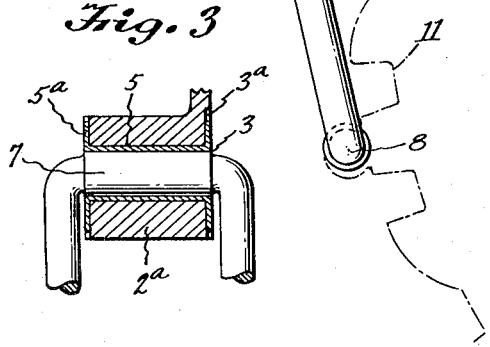
Fig. 3 is a sectional view on line 3—3 of Fig. 1.

In the drawings is shown at 1 a side portion of a railroad car truck frame to which is attached a brake hanger supporting means comprising a bracket 2, at the outer end of which is provided a bearing portion 2ª provided with an aperture 3 extending longitudinally of the bracket 2 and transversely of frame 1. The said bracket 2 and bearing portion 2ª are preferably formed integral with the truck side frame 1 but may, of course, be formed separately and attached by a suitable means to said frame 1. The bearing aperture 3 is preferably cylindrical in shape, and communicates with the exterior of the bearing portion 2ª by means of slot 4 extending longitudinally of the bearing aperture 3 and outwardly and upwardly therefrom. A bushing 5 may be disposed adjacent to the walls of the bearing aperture 3 as will be more fully described hereinafter. In the bearing aperture 3 may be disposed a brake hanger 6, which is preferably of the closed rectangular loop type having upper and lower ends 7 and 8, sides 9 and 10. The hanger 6 may be formed of any suitable material, such as rolled or cast steel. The lower end 8 of the hanger is adapted to cooperate with brake head 11, suggested in the dotted lines in Fig. 1, which brake head 11 is in turn adapted to cooperate with a brake shoe (not shown), as will be readily understood by those skilled in the art.

To prevent wear of the bearing portion 2ª, a bushing, such as shown at 5, may be disposed adjacent to the walls of the aperture 3 so as to be locked against rotative movement therewith, which may be accomplished in any suitable manner, as by the positioning of ears 5ª in slots 3ª. To reduce the wear on the brake hanger ends 7, bushings 12 may be disposed therearound and locked against rotative movement with respect thereto by any suitable means, such as ears 12ª. If desired, bushings may be disposed adjacent to both the walls of the apertures 3 and to the ends 7 to cause all relative movement to take place between the bushings and thereby substantially eliminate the wear on both the bearing portion 2ª and brake hanger end 7.

It will be readily apparent to those skilled in the art, that during the operation of the brakes, the thrust of the brake hanger 6 upon the bearing portion 2ª may be upward or downward, depending upon the direction of rotation of the car wheels. It is, therefore, particularly desirable that a bushing 5 contact with those parts of said bearing portion 2ª which receive the thrust of the brake hanger 6. With the bushing 5 as shown, relative movement of the brake hanger ends 7 takes place with said bushing 5, whatever the direction of thrust of the brake hanger 6, thereby eliminating any wear of the bearing portion 2ª.

Figure 4:
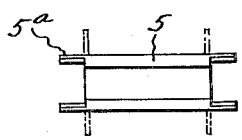
Fig. 4 is a side elevation of the bushing shown in Fig. 1.
Figure 7:
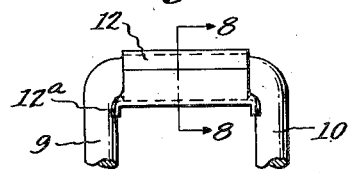
Fig. 7 is a fragmentary elevation showing an end and adjacent sides of a brake hanger with a bushing according to my invention disposed about the end thereof and locked against rotational movement therewith.
Figure 5:
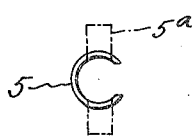
Fig. 5 is an end elevation of the bushing shown in Fig. 4.

The bushing 5 itself may be composed of any suitable material, such as steel, and may be substantially cylindrical in shape, cut away adjacent to the slot 4. Ears 5ª may be provided which may be bent back into slots 3ª to prevent rotative movement of the bushing 5 with respect to the bearing portion 2ª. The position of the ears 5ª when bent back to coincide with the slots 3ª is shown in the dotted lines in Figs. 4 and 5.

The bushing 12 may comprise any suitable material, such as sheet steel, disposed to substantially surround said end 7 and form a split sleeve bushing 12, as shown in the drawings. Means are provided to prevent this bushing 12 from rotative movement with respect to the ends 7. This may be accomplished by means of ears 12ª which are bent so as to contact with and partly surround the side members 9 and 10. The diameter of the end 7, around which the bushing 12 is disposed, may be made equal to that of the sides 9 and 10 or may be enlarged, as shown in the drawings.

Figure 10:
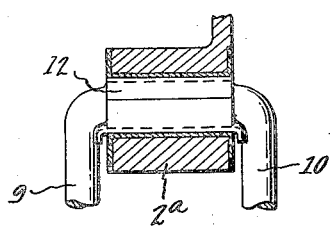
Fig. 10 is a sectional view similar to Fig. 3, showing a bushing disposed about the end of a hanger and affixed against rotational movement therewith, and a bushing disposed adjacent to the walls of the bearing aperture in the bracket and affixed against rotational movement therewith, whereby all relative movement and wear are caused to take place between said bushings.
Figure 9:
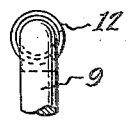
Fig. 9 is an end elevation of the hanger and bushing shown in Fig. 7.

In Fig. 10 are shown bushings 5 and 12 disposed adjacent to and locked against rotation with respect to both bearing portion 2ª and brake hanger end 7, respectively. In such case relative movement and wear due to the movement of the hanger 6 takes place entirely between the replaceable bushings 5 and 12, thereby substantially preventing any wear of the said bearing portion 2ª or brake hanger end 7.

Figure 8:
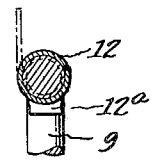
Fig. 8 is a sectional view on line 8—8 of Fig. 7.

During the operation of the brake mechanism, the hanger 6 has a relatively small pivotal movement about the hanger end 7. The slot 4 in the bearing portion 2ª is shown as extending upwardly and outwardly from the aperture 3 at such an angle that a solid bearing surface is presented to the brake hanger end 7, whether the thrust of said brake hanger be upward or downward. The hanger 6, as shown in Fig. 1, may be removed from the bearing apertures 3 by suitably releasing the lower end 8 of the hanger from the brake head 11, swinging said lower end 8 to the position shown in the dotted lines in Fig. 8 with the sides 9 and 10 in alignment with the walls of the slot 4, and moving the hanger 6 longitudinally of the aperture 3 and away from the frame portion 1. The reverse procedure may be employed to dispose said brake hanger end 7 within the aperture 3.

It will be seen that by my invention I have provided a means for decreasing the wear on brake hangers and cooperating bearing portions by providing suitable replaceable bushings adapted to be locked against rotation with respect to said brake hangers or bearing portions.

It will further be noted, that where the width of the slot 4 is equal to or greater than the diameter of the end portion 7, a bushing according to my invention also prevents the lateral displacement of said brake hanger end portion through the said slot.

Furthermore, it is to be understood that the particular forms of apparatus shown and described, and the particular procedure set forth, are presented for purposes of explanation and illustration and that various modifications of said apparatus and procedure can be made without departing from my invention as defined in the appended claims.

What I claim is:—

1. In brake mechanism, in combination, a bearing portion having a bearing aperture, a brake hanger having sides and an end portion integral with said sides, said end portion being disposed within said bearing aperture, and a bushing disposed intermediate said end portion and bearing portion and locked against rotation with respect to one of said elements.

2. In brake mechanism, the combination with a brake hanger support having a bearing portion provided with a slotted bearing aperture, of a brake hanger having an end portion adapted to be received in said bearing aperture, and a bushing disposed between the said end portion and bearing portion and substantially surrounding said end portion and locked against rotative movement with respect to said end portion.

3. In brake mechanism, the combination with a brake hanger support having a bearing portion provided with a slotted bearing aperture, of a brake hanger having an end portion adapted to be received in said bearing aperture, and a bushing disposed between the said end portion and bearing portion and contacting with substantially the entire bearing surface of said bearing portion and locked against rotative movement with respect to said bearing portion.

4. In brake mechanism, the combination with a brake hanger support having a bearing portion provided with a slotted bearing aperture, of a brake hanger having an end portion adapted to be received in said bearing portion, a bushing disposed in said aperture, contacting with substantially the entire bearing surface of said bearing portion and locked against rotative movement with respect thereto to reduce the wear thereof, and another bushing disposed in said bearing aperture and substantially surrounding said end portion and locked against rotative movement with respect thereto to reduce the wear thereof.

5. In brake mechanism, the combination with a brake hanger support having a bearing portion provided with a slotted bearing aperture, of a brake hanger having an end portion adapted to be received in said bearing aperture, the width of the slot being at least as great as the diameter of the said end portion, and a bushing disposed between said end portion and bearing portion and locked against rotative movement with respect to one of said elements, said bushing preventing lateral displacement of the said end portion of said hanger through the said slot.

6. In brake mechanism, a brake hanger having an end portion, a metal bushing substantially encompassing said end portion and locked against rotative movement with respect thereto to reduce the wear thereof.

7. In brake mechanism, a brake hanger of closed rectangular loop shape having ends and sides, and a metal bushing encompassing one of said ends, said bushing having extended portions contacting with the adjacent hanger sides to prevent rotative movement of said bushing with respect to said hanger end.

8. In brake mechanism, a brake hanger supporting bearing portion provided with a bearing aperture, a slot extending longitudinally of said aperture and outwardly of said bearing portion, a metal bushing contacting with the bearing surface of said bearing portion, said bushing having extended portions suitably formed and disposed in grooves in the ends of the bearing portion, whereby said bushing is prevented from rotative movement with respect to the bearing portion.

9. In brake mechanism, a bushing adapted to be positioned in non-rotative relation with respect to the end portion of a brake hanger of closed rectangular loop shape and having end and side portions, said bushing comprising sheet metal adapted to substantially encompass said end portion, said sheet metal having outwardly extending portions adapted to partially encompass the adjacent side portions of the brake hanger.

10. In brake mechanism, a bushing adapted to be positioned in non-rotative relation with respect to the bearing portion of a brake hanger supporting bracket, said bushing comprising sheet metal adapted to contact with the walls of said bearing aperture, said sheet metal having outwardly extending portions adapted to engage in slots in the ends of said bracket to thereby maintain said bushing in non-rotative relation with respect to said bearing portion.

In testimony whereof I affix my signature.

JOSEPH W. BETTENDORF.